United States Patent
Abou-El-Ella et al.

(10) Patent No.: US 9,014,669 B1
(45) Date of Patent: Apr. 21, 2015

(54) LIMIT FAILED NETWORK CONNECTION ATTEMPTS WITH FACTORY DEFAULT SETTINGS

(71) Applicant: Sprint Communications Company L.P., Overland Park, KS (US)

(72) Inventors: Hassan Abou-El-Ella, Overland Park, KS (US); John D. Sumler, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 95 days.

(21) Appl. No.: 13/855,684

(22) Filed: Apr. 2, 2013

(51) Int. Cl.
*H04M 1/66* (2006.01)
*H04W 8/18* (2009.01)

(52) U.S. Cl.
CPC ...................................... *H04W 8/18* (2013.01)

(58) Field of Classification Search
None
See application file for complete search history.

(56) References Cited

U.S. PATENT DOCUMENTS

| | | | |
|---|---|---|---|
| 2008/0118069 A1 | 5/2008 | Yang | |
| 2010/0035599 A1* | 2/2010 | Chen | 455/422.1 |
| 2013/0078948 A1* | 3/2013 | Pecen et al. | 455/411 |
| 2013/0142052 A1 | 6/2013 | Burbidge et al. | |
| 2013/0322230 A1 | 12/2013 | Shaik et al. | |
| 2014/0215081 A1 | 7/2014 | Cili et al. | |
| 2014/0235232 A1 | 8/2014 | Lee et al. | |
| 2014/0241169 A1 | 8/2014 | Collins et al. | |

OTHER PUBLICATIONS

Abou-El-Ella, Hassan, et al., Patent Application entitled "Detection and Self-Healing of a Mobile Communication Device Network Access Failure", filed on Apr. 2, 2013, U.S. Appl. No. 13/855,677.
Notice of Allowance dated Nov. 6, 2014, U.S. Appl. No. 13/855,677, filed Apr. 2, 2013.

* cited by examiner

*Primary Examiner* — Charles Appiah
*Assistant Examiner* — Margaret G Mastrodonato (57) ABSTRACT

A system configured to limit an un-provisioned mobile communication device from repeatedly failing to access a network. The system comprises an authorized activation application, a setting, wherein the setting is configured to limit access to a data connection to the authorized activation application, and a mobile communication device, wherein the mobile communication device is configured to: maintain the data connection in an inactive state, prevent unauthorized applications from activating the data connection, activate the data connection in response to input from the authorized activation application, and attempt to connect to a network in response to the data connection in an active state.

18 Claims, 8 Drawing Sheets

LIMIT FAILED NETWORK CONNECTION ATTEMPTS WITH FACTORY DEFAULT SETTINGS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. In addition to the standard voice function of a mobile telephone, current mobile phones and other similar portable electronic devices may support additional services including short message service (SMS) for text messaging, electronic mail, and packet switching for access to the Internet. At some point, a user may replace his/her mobile telephone with a new mobile telephone. Upon provisioning the new mobile telephone, the user's replaced mobile telephone becomes a recycled mobile communication device. As users replace their mobile telephones, an increasing number of recycled mobile communication devices come into existence.

SUMMARY

In an embodiment, a system configured to limit an un-provisioned mobile communication device from repeatedly failing to access a network is disclosed. The system comprises an authorized activation application, a setting, wherein the setting is configured to limit access to a data connection to the authorized activation application, and a mobile communication device, wherein the mobile communication device is configured to maintain the data connection in an inactive state, prevent unauthorized applications from activating the data connection, activate the data connection in response to input from the authorized activation application, and to attempt to connect to a network in response to the data connection in an active state.

In an embodiment, a mobile communication device configured to selectively connect to a network is disclosed. The mobile communication device comprises: a setting, stored in the mobile communication device, that resists being changed from a first state to a second state by applications lacking sufficient authorization, wherein the mobile communication device is configured to: limit access to the network when the setting is in the first state, build a communication protocol stack in response to changing the setting from the first state to the second state, and attempt a data connection in response to a built communication protocol stack; and an authorized activation application, stored and executing on the mobile communication device, with sufficient authorization to change the setting, wherein the application is configured to change the setting from the first state to the second state in response to activation input.

In an embodiment, a method of limiting a mobile communication device from attempting to access a network unsuccessfully is disclosed. The method comprises: configuring a mobile communication device such that activity of a data connection is responsive to the state of a communication protocol stack, wherein the data connection is inactive when the communication protocol stack is in an un-built state, establishing, in the mobile communication device, a setting in a first state, preventing the communication protocol stack from being built when in the setting is in the first state, building the communication protocol stack in response to the setting being changed from the first state to a second state; and providing, in the mobile communication device, an authorized activation application with sufficient authorization to change the setting, wherein the application is configured to change the setting from the first state to the second state in response to activation input.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A mobile communication device, such as a mobile phone or smart phone, may be used to place voice calls, to send short message service (SMS) messages, to access the internet, to check or send electronic mail, to play games, or for some other purpose. From time to time, a user may replace his/her mobile communication device with another mobile communication device. The replaced mobile communication device mentioned above will be hereinafter referred to as the first mobile communication device, and the mobile communication device replacing it will hereinafter be referred to as the second mobile communication device. Once the user provisions the second mobile communication device, the first mobile communication device will become a recycled device.

In an embodiment, the recycled device may be returned to factory default settings. The recycled device may be unable to make a data connection with a network. Failure to make the data connection with the network may be due to lack of a user subscription, to an invalid MEID, to a parameter being out of sync with the network, or due to another reason. While the recycled device is un-provisioned, it may repeatedly attempt to gain access to the network through the data connection and subsequently fail due to an invalid user subscription. Repeatedly failing to access the network may be a burden on network resources.

The present disclosure teaches providing a factory default setting in a mobile communication device, wherein the factory default setting is configured to limit the mobile communication device from attempting to access a network in a factory default state without first receiving activation instructions from an authorized activation application. In an embodiment, preventing a data connection from being attempted in the factory default state is taught. In an embodiment, the mobile communication device may come from the factory with the data connection turned off and with access to the date connection limited to authorized activation applications.

Alternatively, the mobile communication device may be restricted from attempting to access the network in the factory default state and/or in a non-factory default state only after a predefined number of failed connection attempts have been made. In an embodiment, the recycled device may not be returned to the factory default state in order to preserve information stored on the memory of the recycled device. As described above, the recycled device may be unable to make a data connection with a network. In an embodiment, the recycled device may be limited from attempting the data connection with the network after a predefined number of failed connection attempts, for example after 3 failed connection attempts, after 5 failed connection attempts, after 10 failed connection attempts, or some other predefined number of failed connection attempts.

In an embodiment, the attempts to access the network in the factory default state may be restricted to one connection attempt per predefined time interval. For example the mobile communication device may be restricted to one connection attempt every fifteen minutes or every half hour. This time interval restriction may be applied along with the restriction on predefined number of failed connection attempts. The time interval restriction may change with additional failed connection attempts. For example, two or three failed connection attempts may be allowed spaced fifteen minutes apart. After the two or three failed connection attempts the predefined time interval applied may be lengthened, for example allowing connection attempts only once per hour. The time interval restriction may be motivated by the possibility that service provisioning may not have propagated through the service provider network and by delaying the next connection attempt the provisioning may have the opportunity to complete and propagate through the network.

It is expected that establishing the factory default state in which the mobile communication device is limited from attempting to access the network barring activation instructions from the authorized activation application may reduce the burden on the network by reducing failed connection attempts made by un-provisioned mobile communication devices. It is further expected that establishing the factory default state configured to limit network access attempts without instructions from the authorized activation application may be a more cost-effective way to reduce unsuccessful attempts to access the network than attempting to limit such attempts on the network side.

Figure 1:
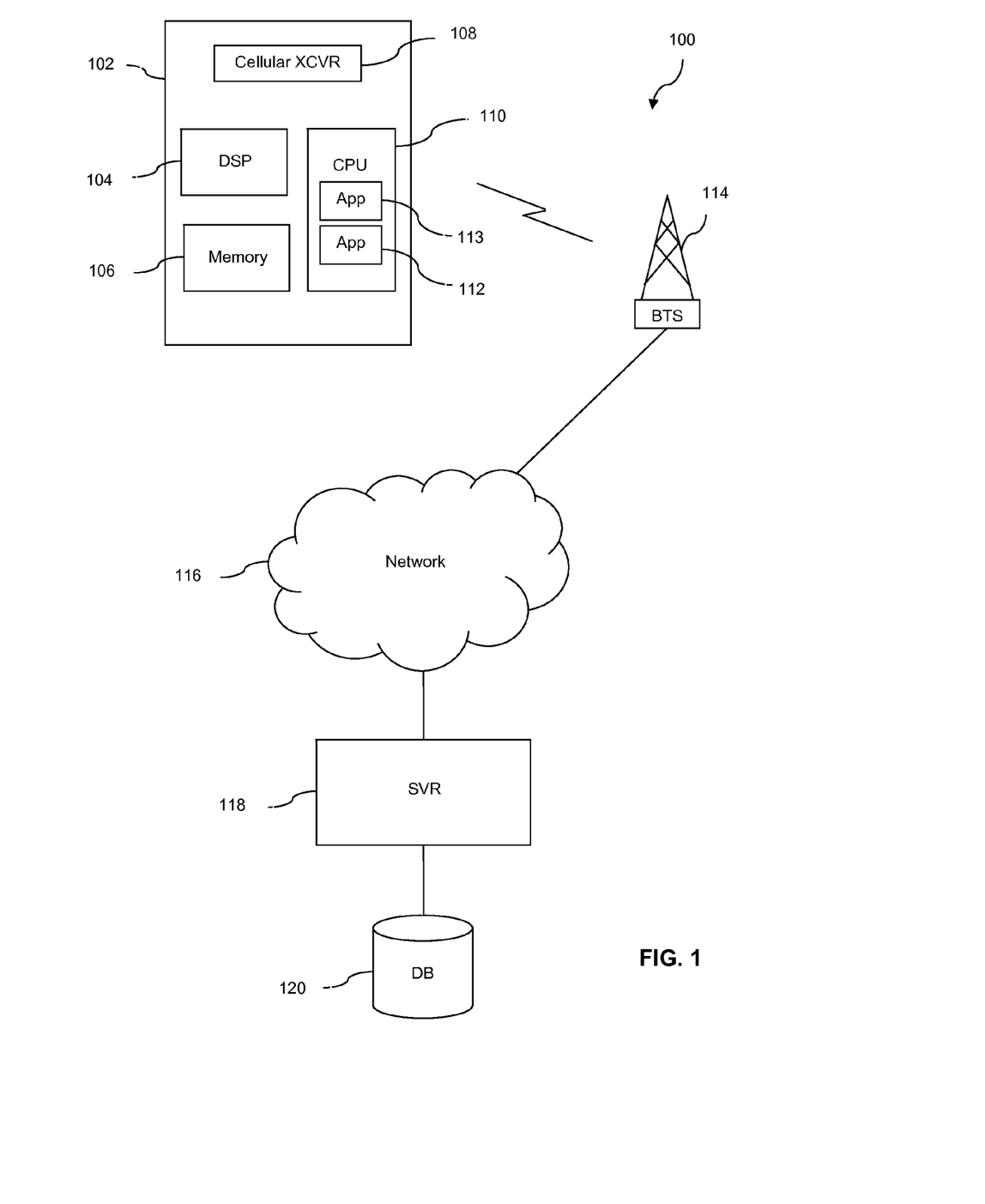
FIG. 1 is a block diagram of a communication system according to an embodiment of the disclosure.

Turning now to FIG. 1, a communication system 100 is described. In an embodiment, the system 100 comprises a mobile communication device 102, a base transceiver station (BTS) 114, a network 116, a server (SVR) 118, and a data store (DB) 120. In an embodiment, the mobile communication device 102 comprises a digital signal processor (DSP) 104, a memory 106, a cellular transceiver (XCVR) 108, a processor (CPU) 110, an authorized activation application 113, and an application 112. The mobile communication device 102 may comprise a mobile phone, a personal digital assistant (PDA), a media player, a laptop computer, a notebook computer, a tablet computer, a pager, a personal navigation assistant, a wireless access card, a smart phone, a feature phone, or another mobile device.

The network 116 may comprise one or more local area networks, one or more wireless local area networks, one or more wide area networks, one or more metropolitan area networks, one or more server area networks, one or more cluster area networks, one or more personal area networks, one or more desk area networks, one or more home area networks, one or more backbone networks, one or more enterprise private networks, one or more virtual networks, one or more private networks, one or more public networks, or combinations thereof. It is understood that the communication system 100 may comprise a plurality of base transceiver stations 114, a plurality of servers 118, a plurality of data stores 120, or combinations thereof.

In an embodiment, the mobile communication device 102 may operate the cellular transceiver 108 to make voice and/or data calls via the base transceiver station 114 and the network 116. The cellular transceiver 108 may communicate with the base transceiver station 114 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The cellular transceiver 108 may be conducting wireless communication handshaking even when not making voice and/or data calls. In an embodiment, the mobile communication device 102 may operate the cellular transceiver 108 to access the network 116 through the base transceiver station 114 in order to access information in the data store 120 contained on the server 118. In an embodiment, the information contained in the data store 120 may comprise a parameter, a user credential, a factory default credential, a user identifier, a factory default identifier, user account information, an MEID, service provider information, or it may comprise some other information.

In an embodiment, the mobile communication device 102 may be configured to restrict the cellular transceiver's 108 access to the network 116 when the mobile communication device 102 is in a factory default state. The factory default state may be the original state of the mobile communication device 102 when it was manufactured. The mobile communication device 102 may be considered to be in the factory default state when it is un-provisioned and is not associated with an active user subscription. The user subscription may be said to be active when a user identifier corresponds with information stored on the network 116 such that access to the network 116 is given to the mobile communication device 102 based on recognition of the user identifier by the information stored on the network 116. The information on the network 116 may comprise information associating the user identifier with a user account. If the user account is paid, the mobile communication device 102 may be granted access to the network 116, and the user subscription associated with the mobile communication device 102 may be considered active because the user identifier may be recognized by the network 116 as corresponding to the paid user account.

Conversely, the user subscription may be said to be inactive when the mobile communication device 102 is denied access to the network 116 because user identifier does not correspond to information stored on the network 116. The user identifier may be out of sync with information stored on the network 116, the user identifier may be associated with an unpaid user account, or the user identifier may fail to be recognized and may be denied access to the network 116 for another reason.

The mobile communication device 102 may come to be in the factory default state for a number of reasons: the mobile communication device 102 may be fresh from the factory, it may have been reset by customer care, it may be a recycled device that has been reset by a user, or it may have arrived in the factory default state for some other reason. For example, the mobile communication device 102 may come to be in the factory default state by determining, by the mobile communication device 102, that failure to access a network is based on a first identifier, performing a limited reset of the mobile communication device 102, wherein the first identifier on the mobile communication device 102 is replaced by a factory default identifier, confirming, through use of the factory default identifier, that the first identifier is inactive, and establishing the factory default state. For further details about establishing the factory default state as described hereinabove, see U.S. patent application Ser. No. 13/855,677, filed Apr. 2, 2013, entitled "Detection and Self-Healing of a Mobile Communication Device Network Access Failure," by Hassan Abou-El-Ella, et al., which is hereby incorporated by reference in its entirety.

In the factory default state, there may be a setting in the mobile communication device 102 configured such that the cellular transceiver 108 is restricted from attempting to access the network 116 until the setting is changed from a first value to a second value. It is contemplated that changing the setting may comprise verifying that an application has an authorization level restricted to select authorized activation applications which may include the authorized activation application 113. In an embodiment, the authorized activation application 113 may be a device self-service application or open mobile alliance device management (OMA-DM). The setting may prevent unauthorized applications such as the application 112 from attempting to access the network 116. A radio interface layer may be left intact and accessible when the mobile communication device 102 is in the factory default state in order to allow emergency communications. Emergency communication may comprise, placing a call to an emergency number which may be 9-1-1, 1-1-2, 0-0-0, 9-9-9, or some other number at which emergency service personnel can be contacted.

In an embodiment, the mobile communication device 102 may be prevented from attempting a data connection with the network 116 when the mobile communication device 102 is in the factory default state. In one scenario, it may be that the application 112 is configured to establish the data connection with the network 116 but is unable to change the setting and thus fails to attempt the data connection. In other scenarios, other applications may be likewise prevented from attempting to access the network 116.

Alternatively, the data connection with the network 116 may be attempted in the factory default state and/or in a non-factory default state until a predetermined number of connection attempts have failed. In an embodiment, the data connection may be restricted after about 30 failed attempts, after about 20 failed attempts, after about 15 failed attempts, after about 10 failed attempts, after about 5 failed attempts, or after some other predetermined number of failed attempts. Limiting access to the data connection after a predetermined number of failed attempts may help reduce the burden on the network caused by un-provisioned mobile communication devices repeatedly attempting to access the network.

In an embodiment, the data connection may be turned off due to the absence of a communication protocol stack when the mobile communication device is in the factory default state. In some contexts, the communication protocol stack may be a TCP/IP stack, wireless application protocol, an OCS stack, an SS7 stack, a network protocol stack, a WiMAX protocol stack, a ZigBee stack, a GSM protocol stack, or layered stack. It may be that the communication protocol stack is built after, and/or in response to, changing the setting from the first value to the second value in response to instructions from the authorized activation application 113. The mobile communication device 102 may attempt to establish the data connection in response to the built communication protocol stack. It is contemplated that in an alternative embodiment, the data connection may be turned on, but the setting prevents unauthorized applications from attempting to access the network 116 using the data connection.

In an embodiment, the mobile communication device 102 may attempt to access the network 116 after the setting has been changed by the authorized activation application 113. The authorized activation application 113 may be configured to change the setting from a first state to a second state in response to user input, powering on the mobile communication device 102, or in response to other activation instructions. Changing the setting from the first state to the second state may allow the data connection with the network 116 to be attempted. If it is the case that the mobile communication device 102 fails to connect to the network 116, the authorized activation application 113 may be configured to return the setting to the first state and thus limit the mobile communication device 102 from attempting to access the network 116 until the setting is changed back to the second state. The first state may be a factory default state established by a manufacturer, a factory default value established by a manufacturer, a first/initial value, a factory default setting, or another initial, first time state of the setting in the mobile communication device 102.

In an embodiment, a user may direct the authorized activation application 113 to change the setting from the first value to the second value in order to provision the mobile communication device 102. The mobile communication device 102 may be provisioned using the data connection with the network 116 to gain access to the server 118 and the data store 120. The user's subscription information and other account information may be assigned to the mobile communication device 102, and the mobile communication device 102 may be provisioned for access to the network 116. The setting may be configured such that it does not restrict access to the data connection when the mobile communication device 102 is provisioned. Once the mobile communications device 102 is successfully provisioned and given access to the network 116, the setting may avoid restricting, limiting, and/or interfering with access to the data connection by remaining in the second state after it has been changed from the first state to the second state by the authorized activation application 113 until the mobile communication device 102 is returned to the factory default state.

In an embodiment, the mobile communication device 102 may maintain the data connection in an inactive state in order to limit failed attempts to access the network 116 with the data connection. Once the data connection has been activated in response to input from the authorized activation application 113, the mobile communication device 102 may attempt to connect to the network 116 in response to the active data connection. Once the mobile communication device 102 has gained access to the network 116, the mobile communication device 102 may be able to make voice calls, send SMS messages, access the internet, send and receive Email messages, and may further use connection to the network 116 for other communications.

Figure 2:
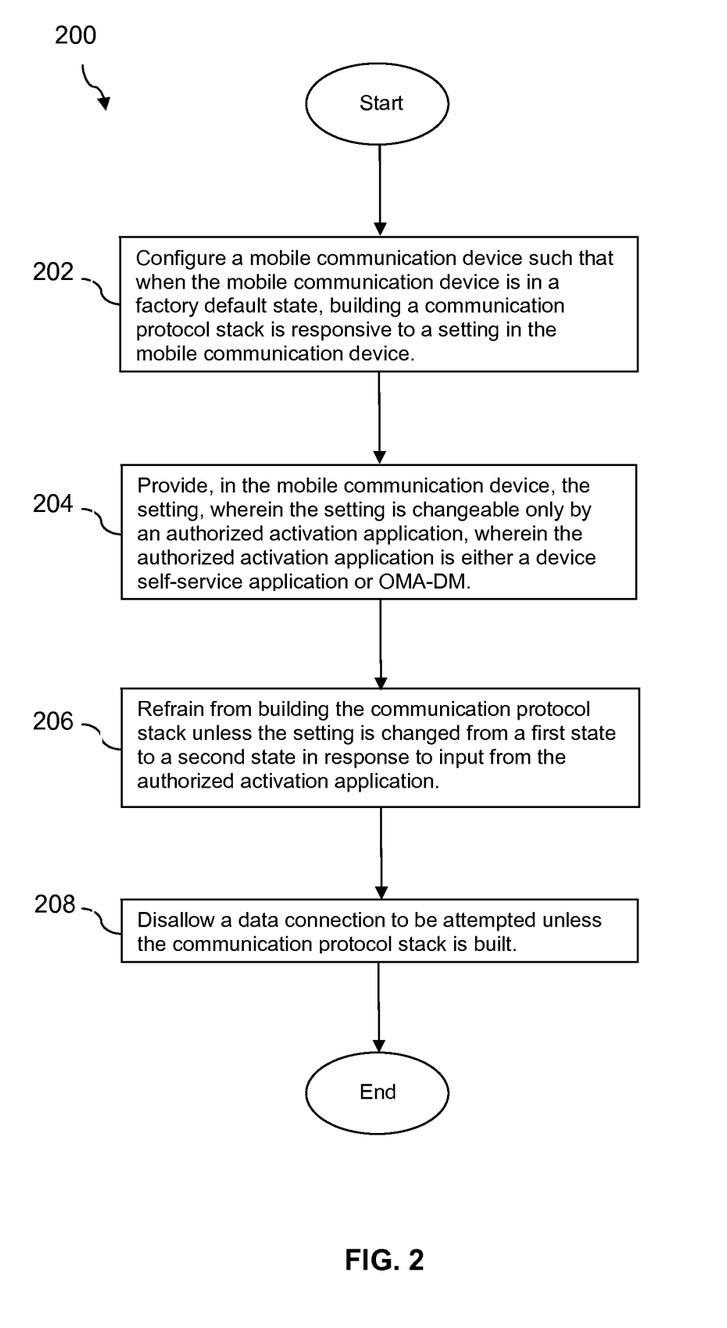
FIG. 2 is a flowchart of a method according to an embodiment of the disclosure.

Turning now to FIG. 2, a method 200 is described. At block 202, the mobile communication device 102 may be configured such that when the mobile communication device 102 is in a factory default state, building a communication protocol stack is responsive to a setting in the mobile communication device 102. The setting may be provided in the mobile communication device 102 at block 204. In an embodiment, building the communication protocol stack may be responsive to a value of the setting determined by the state of the setting. In some cases, the setting may be changeable only by the authorized activation application 113. In an embodiment, the authorized activation application 113 may be either a device self-service application or open mobile alliance device management (OMA-DM). It may be that the setting avoids being changed by applications other than the authorized activation application 113 by changing only in response to an application possessing a high level of authorization, wherein the only application with high enough authorization is the authorized activation application 113. In an embodiment, the setting may be changed by the authorized activation application 113 in response to a user input.

At block 206, the mobile communication device 102 may refrain from building the communication protocol stack unless the setting is changed from a first state to a second state in response to input from the authorized activation application 113. In an embodiment, the setting may be in the first state when the mobile communication device 102 is in the factory default state. At block 208, the mobile communication device 102 may disallow a data connection to be attempted unless the communication protocol stack is built. In an embodiment, attempting the data connection may be disallowed because the data connection is off until the communication protocol stack is built.

The mobile communication device 102 may be configured to build the communication protocol stack in response to changing the setting from the first state to the second state and may be further configured to attempt a data connection in response to a built communication protocol stack. In an embodiment, the communication protocol stack may comprise a TCP/IP stack, wherein TCP/IP stack may refer to a protocol stack configured to allow the mobile communication device 102 to communicate using TCP/IP on the network 116. The setting may be configured to respond to applications with sufficient authorization, and the setting may be configured to remain in the first state if authorization is insufficient. Responding strictly to applications with sufficiently high authorization may limit access to the network 116 when the setting is in the first state. The setting may be configured to change from the first state to a second state in response to input from applications with sufficient authorization such as the authorized activation application 113. The authorized activation application 113 may be configured to change the setting from the first state to the second state in response to activation input.

Figure 3:
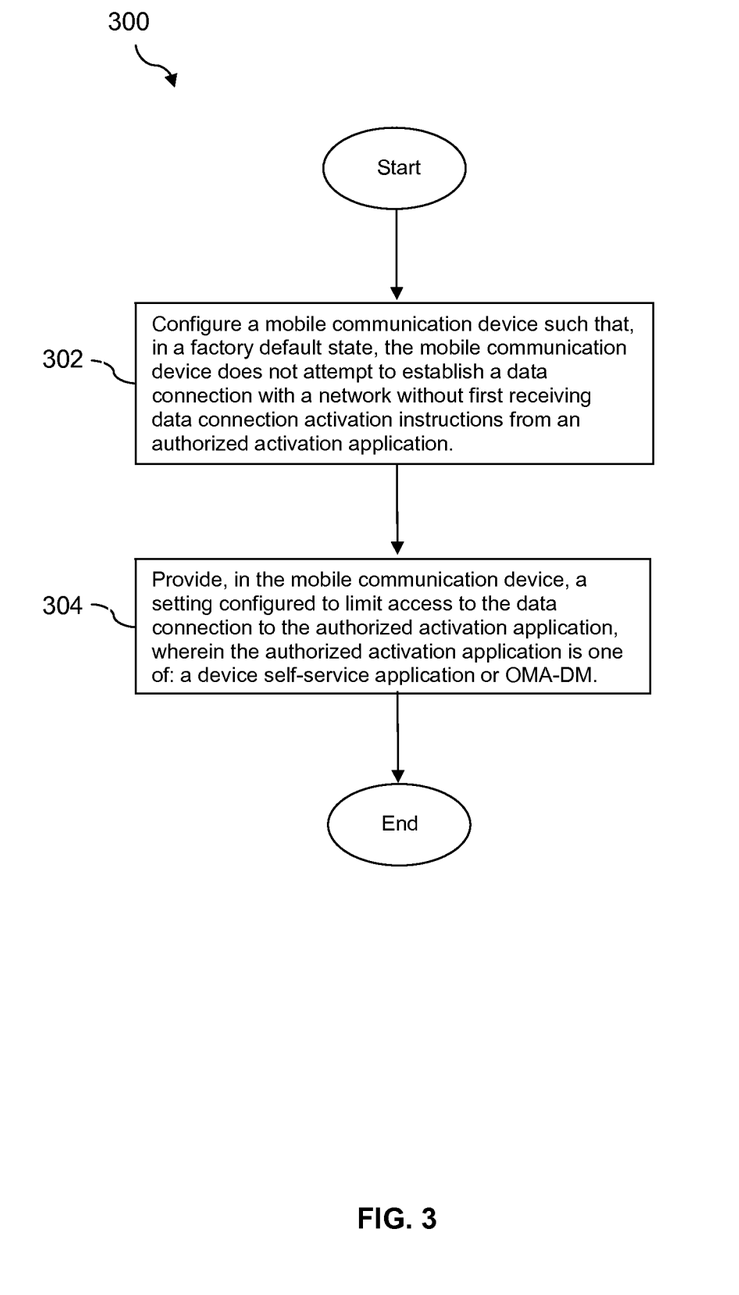
FIG. 3 is a flowchart of a method according to an embodiment of the disclosure.

Turning now to FIG. 3, a method 300 is described. At block 302, the mobile communication device 102 may be configured such that, in a factory default state, the mobile communication device 102 does not attempt to establish a data connection with the network 116 without first receiving data connection activation instructions from the authorized activation application 113. The mobile communication device 102 may not attempt to establish the data connection because a communication protocol stack may not be built or because access to the data connection is unavailable to applications other than the authorized activation application 113. At block 304, a setting may be provided in the mobile communication device 102, wherein the setting may be configured to limit access to the data connection to the authorized activation application 113. In an embodiment, the authorized activation application 113 may a device self-service application or open mobile alliance device management (OMA-DM). The setting may be configured to limit access to the data connection by being responsive to a high authorization level in the factory default state. In an embodiment, receiving data connection instructions, as described with reference to block 302, may comprise changing the setting from a first state to a second state, changing the value of the setting from a first value to a second value, changing a parameter of the setting, or changing the setting in some other way.

In an embodiment, the mobile communication device 102 may be configured to maintain the data connection in an inactive state. In order to maintain the inactive state of the data connection, unauthorized applications may be prevented from activating the data connection. The mobile communication device 102 may be configured to activate the data connection in response to input from the authorized activation application 113 and to attempt to connect to the network 116 in response to the activated data connection. Both the authorized activation application 113 and the setting may be stored on the mobile communication device 102, wherein the setting is configured to limit access to the data connection to the authorized activation application 113.

Figure 4:
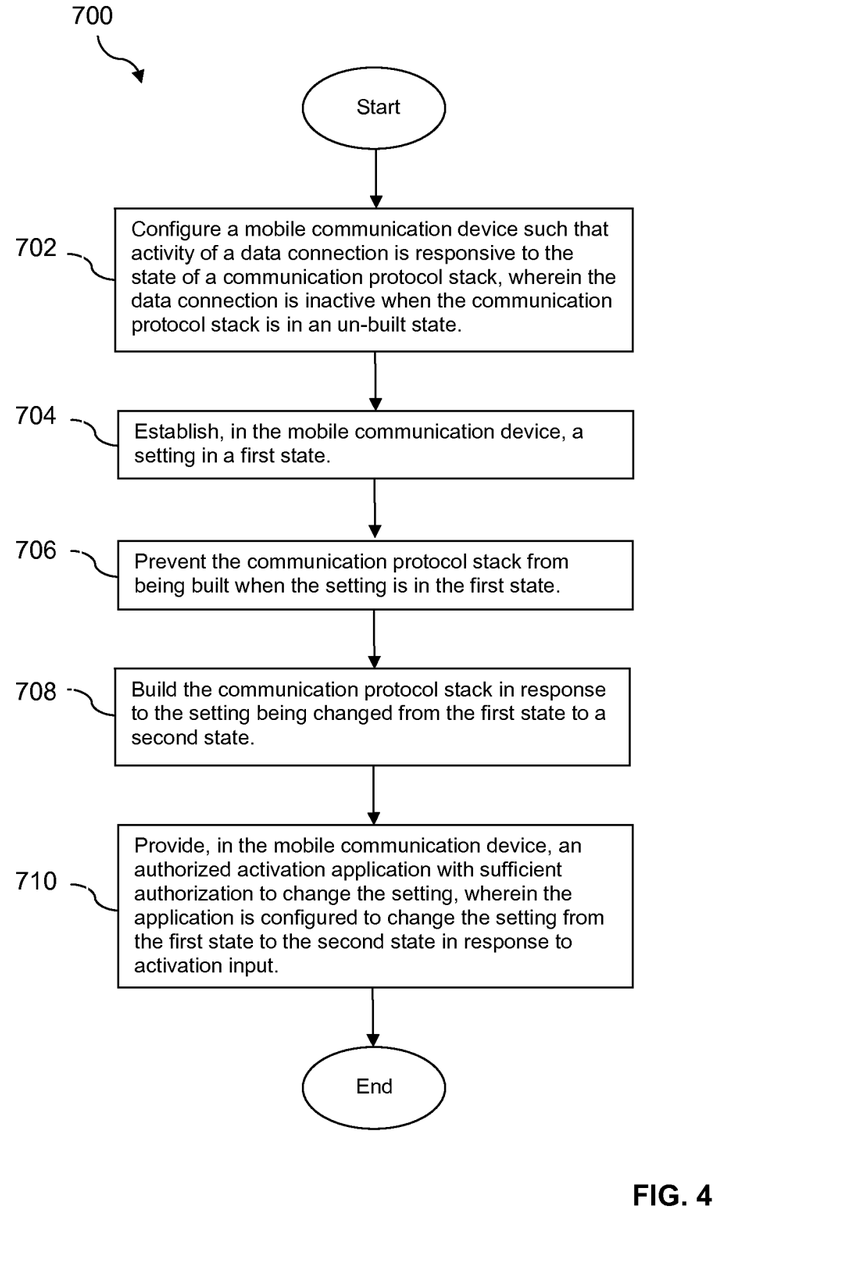
FIG. 4 is a flowchart of a method according to an embodiment of the disclosure.

Referring now to FIG. 4, a method 700 is described. In some cases, the method 700 may be performed by components of the communication system 100. For example, steps of the method 700 may be performed by the mobile communication device 102, the authorized activation application 113, and/or other components of the communication system 100. At block 702, a mobile communication device 102 may be configured such that activity of a data connection is responsive to the state of a communication protocol stack. In an embodiment, the data connection may be inactive when the communication protocol stack is in an un-built state. At block 704, a setting in a first state may be established in the mobile communication device. The setting may be configured to resist being changed from the first state to a second state by applications lacking sufficient authorization, and to change from the first state to the second state in response to instructions from the authorized activation application. In an embodiment, the setting may be configured to remain in the first state until changed by an application with sufficient authorization. At block 706, prevent the communication protocol stack from being built when the setting is in the first state. The setting may be configured to change from the first state to the second state in response to input from applications with sufficient authorization. In an embodiment, a radio interface layer of the mobile communication device may be left intact and accessible in the absence of a built communication protocol stack in order to allow emergency communications as described hereinabove with reference to FIG. 1.

The communication protocol stack is built at block 708 in response to the setting being changed from the first state to the second state. In an embodiment, the mobile communication device 102 may establish a communication channel in response to building the communication protocol stack. At block 710, an authorized activation application with sufficient authorization to change the setting may be provided in the mobile communication device 102. In an embodiment, the application may be configured to change the setting from the first state to the second state in response to activation input which may comprise input from a user, activation instructions, provisioning instructions, information indicating that the mobile communication device has been powered on, a wireless activation input, or combinations thereof. In some contexts, changing the setting from the first state to the second state may comprise changing a first value to a second value.

Figure 5:
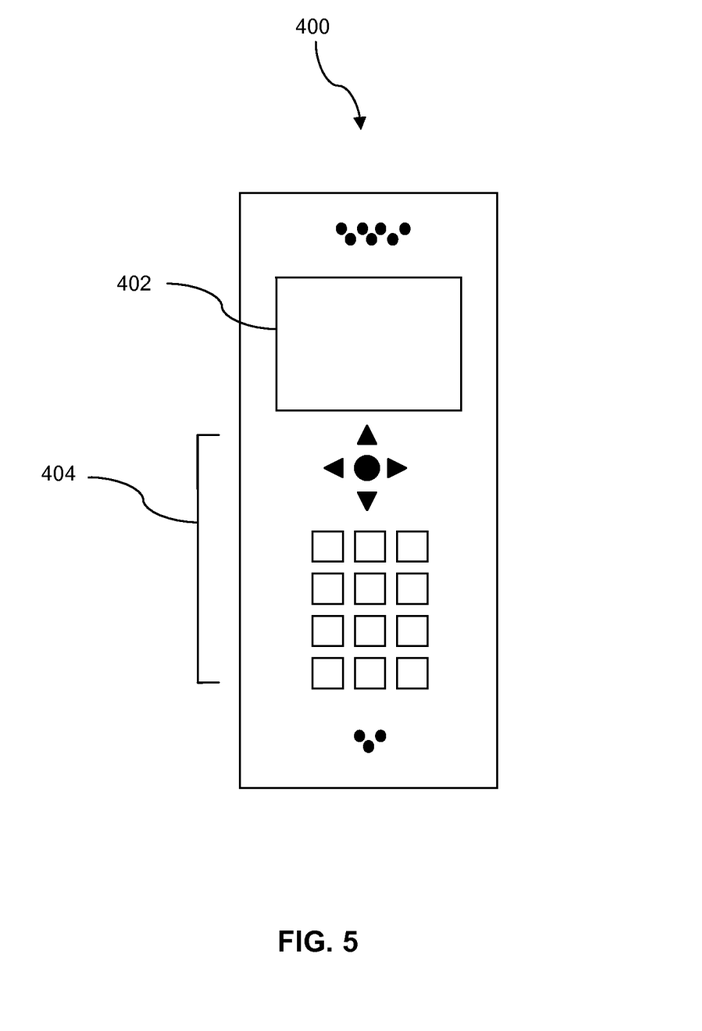
FIG. 5 is an illustration of a mobile device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
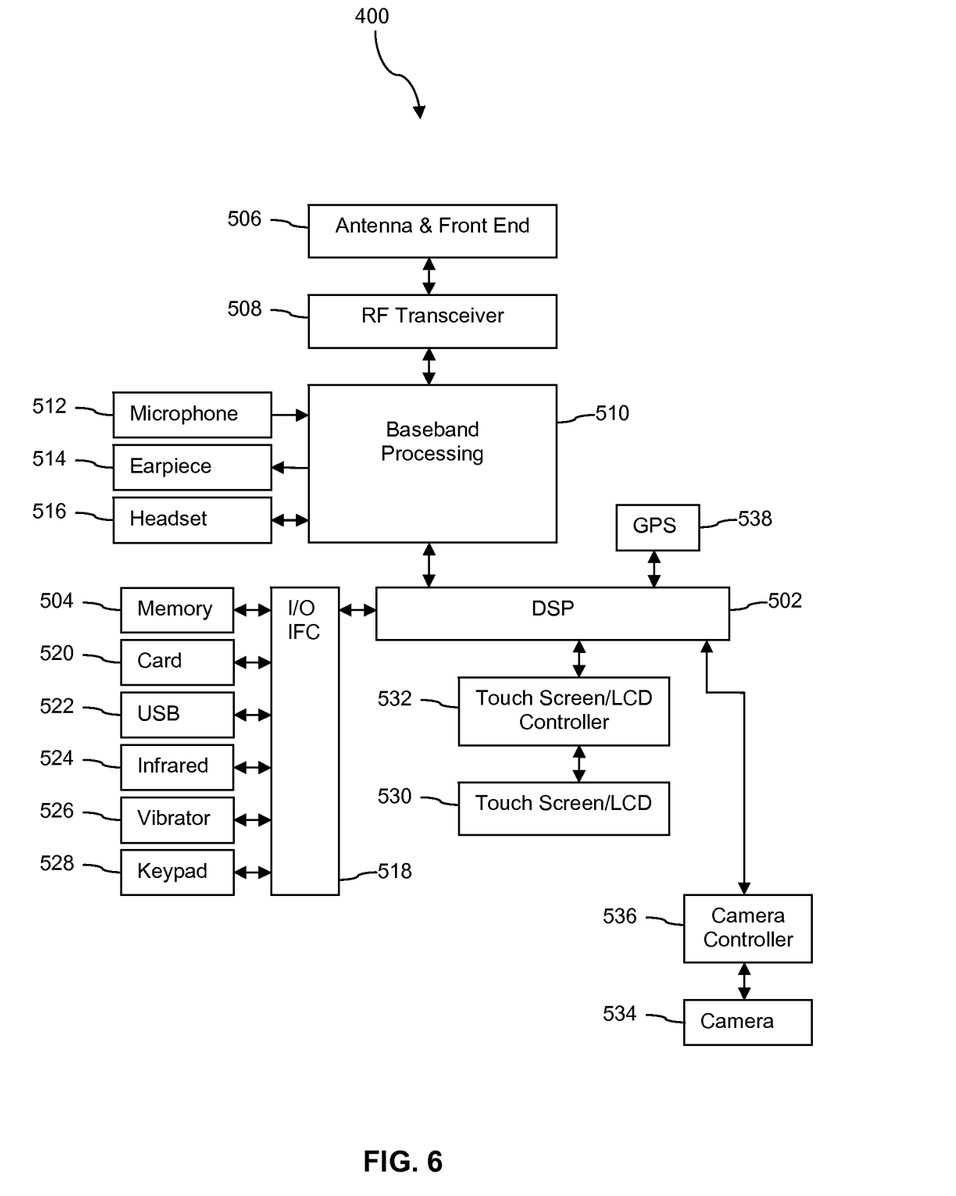
FIG. 6 is a block diagram of a hardware architecture of a mobile device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
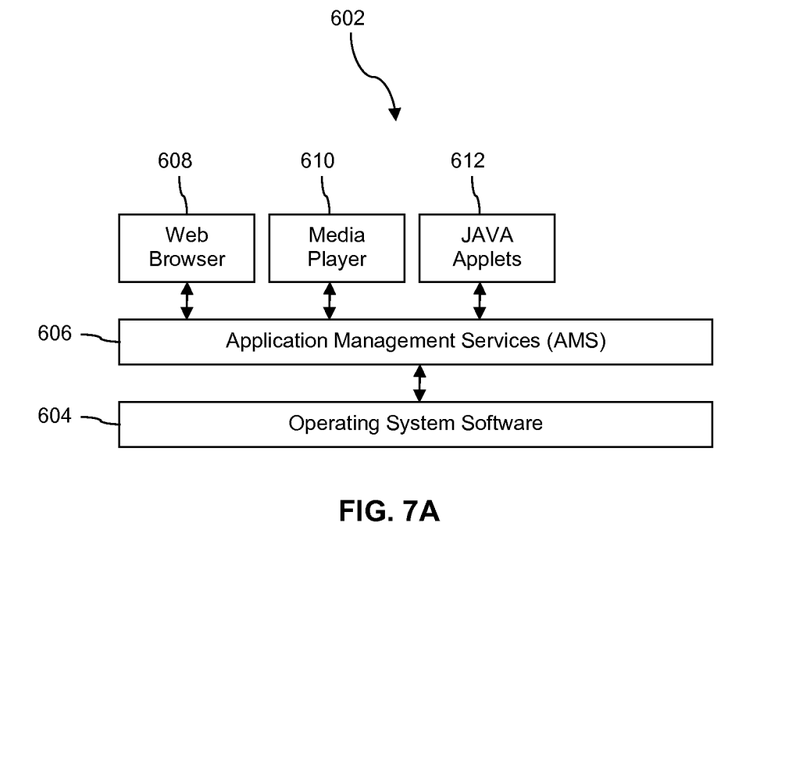
FIG. 7A is a block diagram of a software architecture of a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
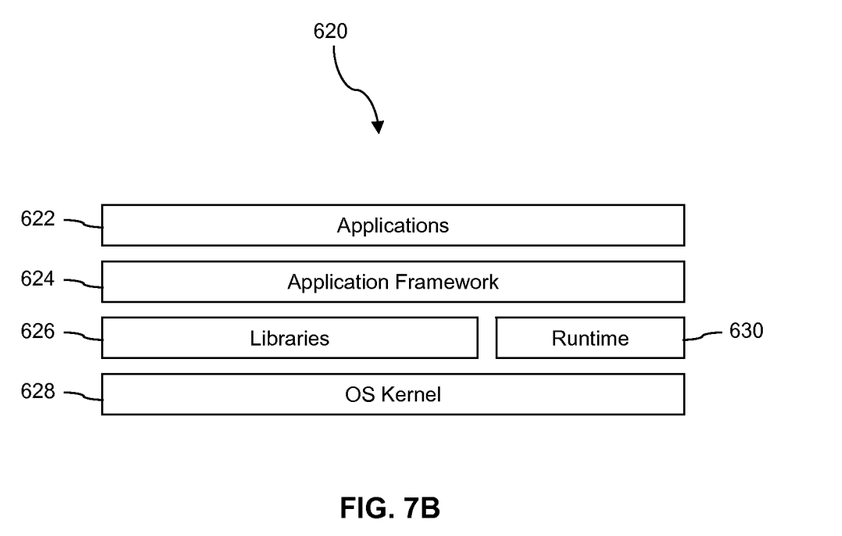
FIG. 7B is a block diagram of another software architecture of a mobile device according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
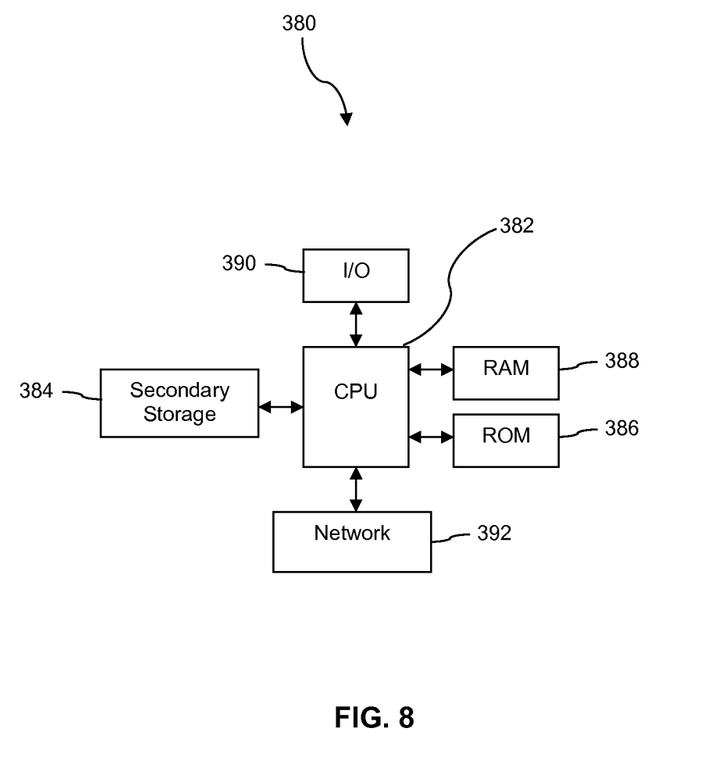
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system configured to limit an un-provisioned mobile communication device from repeatedly failing to access a network, the system comprising:
   an authorized activation application; and
   the un-provisioned mobile communication device that has been returned to a factory default setting, wherein the factory default setting is a setting that is configured to restrict access of a data connection with the network to the authorized activation application, wherein the mobile communication device is configured by at least one processor to:
   maintain the data connection with the network using a radio interface layer of the un-provisioned mobile communication device that is in the factory default setting,
   prevent unauthorized applications from activating the data connection,
   activate the data connection in response to input from the authorized activation application, and
   attempt to connect to the network in response to the data connection being active.

2. The system of claim 1, wherein the mobile communication device comprises the authorized activation application.

3. The system of claim 1, wherein the authorized activation application is configured to activate the data connection upon input from a user, wireless input from a service provider, or upon device start up.

4. The system of claim 1, wherein activating the data connection in response to input from the authorized activation application comprises building a communication protocol stack.

5. The system of claim 1, wherein the authorized activation application is a device self-service application.

6. The system of claim 1, wherein the mobile communication device prevents unauthorized applications from accessing the data connection by way of a data connection access authorization level.

7. An un-provisioned mobile communication device configured to selectively connect to a network, comprising:
   a communication transceiver;
   at least one processor;
   a non-transitory memory comprising an authorization application;
   a setting, stored in the non-transitory memory of the un-provisioned mobile communication device, configured to be changed from a factory default setting to a different setting by an authorization application having sufficient authorization, wherein the factory default setting is configured to restrict access of a data connection with the network to the authorized activation application, and wherein the mobile communication device is configured to:

not attempt to establish a data connection with the network responsive to the setting being in the factory default setting, build a communication protocol stack in response to changing the setting from the factory default setting to the different setting, and attempt the data connection in response to the built communication protocol stack; and the authorized activation application, stored in the non-transitory memory and executed by the at least one processor of the un-provisioned mobile communication device, having sufficient authorization to change the setting, wherein the authorized application is configured to change the setting from the factory default setting to the different setting in response to an activation input.

8. The un-provisioned mobile communication device of claim 7, wherein the authorized activation application is a device self-service application.

9. The un-provisioned mobile communication device of claim 7, wherein the data connection is used to provision the un-provisioned mobile communication device.

10. The un-provisioned mobile communication device of claim 7, further comprising:

an active radio interface layer, for the communication transceiver, configured to allow a call to be placed to an emergency number responsive to being in the factory default setting.

11. The un-provisioned mobile communication device of claim 7, wherein the factory default setting is a value and the different setting corresponds to a different value.

12. The un-provisioned mobile communication device of claim 7, wherein the activation input is input from a user, activation instructions, provisioning instructions, information indicating that the un-provisioned mobile communication device has been powered on, a wireless activation input, or combinations thereof.

13. A method of limiting an un-provisioned mobile communication device from attempting to access a network unsuccessfully, the method comprising:

configuring the un-provisioned mobile communication device such that activity of a data connection is responsive to the state of a communication protocol stack, wherein the data connection is inactive when the communication protocol stack is in an un-built state, and wherein the communication protocol stack is absent based on a factory default setting of the un-provisioned mobile communication device;

establishing the factory default setting in the un-provisioned mobile communication device, wherein the factory default setting is configured to restrict access of the data connection with the network to an authorized activation application of the un-provisioned mobile communication device;

preventing the communication protocol stack from being built responsive to establishing the factory default setting;

building the communication protocol stack in response to the un-provisioned mobile device being changed from the factory default setting to a different setting; and providing, in the un-provisioned mobile communication device via a radio interface layer, the authorized activation application with sufficient authorization to change to the different setting, wherein the authorized application is configured to change the factory default setting to the different setting in response to activation input.

14. The method of claim 13, wherein the authorized activation application is configured to provision the un-provisioned mobile communication device.

15. The method of claim 13, wherein the factory default setting is configured to:

resist being changed from the factory default setting to the different setting by applications lacking sufficient authorization, and change from the factory default setting to the different setting in response to instructions from the authorized activation application.

16. The method of claim 13, wherein the activation input is input from: a user, activation instructions, provisioning instructions, information indicating that the mobile communication device has been powered on, a wireless activation input, or combinations thereof.

17. The method of claim 13, further comprising: maintaining the active radio interface layer such that a call may be placed to an emergency number.

18. The method of claim 13, further comprising: establishing a communication channel in response to building the communication protocol stack.

* * * * *